(12) United States Patent
Christensen (10) Patent No.: US 6,611,615 B1
(45) Date of Patent: Aug. 26, 2003

(54) METHOD AND APPARATUS FOR GENERATING CONSISTENT IMAGE REGISTRATION

(75) Inventor: Gary E. Christensen, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 09/344,621

(22) Filed: Jun. 25, 1999

(51) Int. Cl.$^7$ ................................................. G06K 9/00

(52) U.S. Cl. ......................... 382/130; 600/407; 128/922

(58) Field of Search ................................. 382/130, 128, 382/154, 294, 131, 276; 715/532; 600/407; 128/922; 424/9.4

(56) References Cited

U.S. PATENT DOCUMENTS

| | | | |
|---|---|---|---|
| 4,590,607 A | 5/1986 | Kauth | 382/41 |
| 4,644,582 A | 2/1987 | Morishita et al. | 382/6 |
| 4,662,222 A | 5/1987 | Johnson | 73/602 |
| 4,987,412 A | 1/1991 | Vaitekunas et al. | 340/721 |
| 5,027,422 A | 6/1991 | Peregrim et al. | 382/48 |
| 5,048,103 A | 9/1991 | Leclerc et al. | 382/44 |
| 5,351,310 A | 9/1994 | Califano et al. | 382/22 |
| 5,390,110 A | 2/1995 | Cheney et al. | 364/413.13 |
| 5,483,606 A | 1/1996 | Denber | 382/294 |
| 5,490,221 A | 2/1996 | Ransford et al. | 382/130 |
| 5,531,520 A | 7/1996 | Grimson et al. | 382/131 |
| 5,568,384 A | 10/1996 | Robb et al. | 364/419.13 |
| 5,581,638 A | 12/1996 | Givens et al. | 382/294 |
| 5,633,951 A | 5/1997 | Moshfeghi | 382/154 |
| 6,009,212 A * | 12/1999 | Miller et al. | 382/294 |
| 6,154,518 A * | 11/2000 | Gupta | 378/4 |
| 6,236,742 B1 * | 5/2001 | Handel | 382/128 |
| 6,363,163 B1 * | 3/2002 | Xu et al. | 382/130 |

FOREIGN PATENT DOCUMENTS

| | | | |
|---|---|---|---|
| WO | WO 98/01818 | 1/1998 | G06K/9/00 |
| WO | WO 99/24932 | 5/1999 | G06K/9/00 |

OTHER PUBLICATIONS

Thirion, "Image matching as a diffusion process: an analogy with Maxwell's demons" *Medical Image Analysis* (1998), vol. 2, No. 3, pp. 243–260.

Woods et al. "Automated Image Registration: II. Intersubject Validation of Linear and Nonlinear Models" *Journal of Computer Assisted Tomography* 1–13, (1998).

Guimond et al. *International Journal of Pattern Recognition and Artificial Intelligence* vol. 11 No. 8 (1997) pp. 1345–1365.

Pelizzari et al. Accurate Three–Dimensional Registration of CT, PET, and/or MR Images of the Brain, *Journal of Computer Assisted Tomography* 13(1):20–26 Jan./Feb. (1989).

Burr "A Dynamic Model for Image Registration", *Computer Graphics and Image Processing* 15, 102–112 (1981).

(List continued on next page.)

*Primary Examiner*—Jayanti K. Patel
*Assistant Examiner*—Barry Choobin
(74) *Attorney, Agent, or Firm*—Needle & Rosenberg, P.C.

(57) ABSTRACT

The present invention provides a method and apparatus for generating inversely related forward and reverse image transformations in any image registration technique with ambiguous correspondence based upon the joint estimation of the transformation. Accordingly, two image data sets are received, a source and a target. Current sets of forward and reverse displacement fields are initialized. From the current set of forward and reverse displacement fields, the consistent forward transformation and the consistent reverse transformation are jointly estimated. These transformations are outputted.

56 Claims, 6 Drawing Sheets

OTHER PUBLICATIONS

Penn et al. "Stereotactic Surgery with Image Processing of Computerized Tomographic Scans", *Neurosurgery* vol. 3, No. 2, (1978).

Maurer et al., "A Review of Medical Image Registration", *Interactive Image Guided Neurosurgery,* Ch. 3, pp 17–44.

Davatzikos et al., "Image Registration Based on Boundary Mapping", Johns Hopkins University, Mar., 1995, pp 1–30.

Amit et al., "Graphical Shape Templates for Deformable Model Registration", University of Chicago, pp 1–19.

Joshi et al., "Hierarchical brain mapping via a generalized Dirichlet solution for mapping brain manifolds".

Trouve A., "*Diffeomorphisms Groups and Pattern Matching In Image Analysis*", International Journal of Computer Vision, US, Kluwer Academic Publishers, Norwell, vol. 28, No. 3, 1 pps. 213–221, Jul. 1998.

Christensen G.E., et al. "*Volumetric Transformation of Brain Anatomy*", IEEE Transactions on Medical Imaging, US, IEEE Inc., NY vol. 16, No. 6, pp.s. 864–877 Dec. 1997.

Christensen G.E. et al. "*Deformable Templates Using Large Deformation Kinematics*", IEEE Inc. , NY, vol. 5, No. 10, pps. 1435–1447 Oct. 1996.

\* cited by examiner

METHOD AND APPARATUS FOR GENERATING CONSISTENT IMAGE REGISTRATION

ACKNOWLEDGEMENT

This invention was made partially with government support under grant No. NS35368 awarded by the National Institutes of Health. The government has certain rights in the invention.

BACKGROUND OF INVENTION

1. Field of the Invention

The invention relates to a method and apparatus for generating consistent image registration. More specifically, the invention relates to a method and apparatus for generating inversely related forward and reverse image transformations in any image registration technique with ambiguous correspondence.

2. Description of Prior Art

A reasonable but perhaps not always desirable assumption is that the mapping of one anatomical image (source) to another (target) is diffeomorphic, i.e., continuous, one-to-one, onto, and differentiable. A diffeomorphic mapping has a unique inverse that maps the target image back onto the source image. Thus, it is reasonable goal to estimate a transformation from image A to B that should equal the inverse of the transformation estimated from B to A assuming a diffeomorphic mapping exists between the images. However, this consistency between the forward and reverse transformations is not guaranteed with many image registration techniques.

Depending on the application, the diffeomorphic assumption may or may not be valid. This assumption is valid for registering images collected from the same individual imaged by two different modalities such as MRI and CT, but it is not necessarily valid when registering images before and after surgery. Likewise, a diffeomorphic mapping assumption may be valid for registering MRI data from two different normal individuals if the goal is to match the deep nuclei of the brain, but it may not be valid for the same data sets if the goal is to match the sulcal patterns.

Alternatively, diffeomorphic transformations may be used to identify areas where two image volumes differ topologically by analyzing the properties of the resulting transformation. For example, consider the problem of matching an MRI image with a tumor to one without a tumor. A possibly valid diffeomorphic transformation would be one that registers all of the corresponding brain structures by shrinking the tumor to a small point. Such a transformation would have an unusually small Jacobian, which could be used to detect or identify the location of the tumor. Conversely, consider the inverse problem of matching the image without the tumor to the one with the tumor. A valid registration in this case may be to register all of the corresponding brain structures by allowing the transformation to "tear" (i.e., not be diffeomorphic) at the site of the tumor. Just as valid could be a diffeomorphic transformation that registers all of the corresponding brain structures by allowing the transformation to stretch at the site of the tumor.

As in the previous examples, the assumption can be made that a valid transformation is diffeomorphic everywhere except possibly in regions where the source and target images differ topologically, e.g., in the neighborhood of the tumor. These ideas can be extended to certain non-diffeomorphic mapping problems by including boundary conditions to model, isolate or remove regions that differ topologically.

Transformations that are diffeomorphic maintain topology guaranteeing that connected subregions remain connected, neighborhood relationships between structures are preserved, and surfaces are mapped to surfaces. Preserving topology is important for synthesizing individualized electronic atlases; the knowledge base of the atlas maybe transferred to the target anatomy through the topology preserving transformation providing automatic labeling and segmentation. If total volume of a nucleus, ventricle, or cortical sub region are an important statistic it can be generated automatically. Topology preserving transformations that map the template to the target also can be used to study the physical properties of the target anatomy such as mean shape and variation. Likewise, preserving topology allows data from multiple individuals to be mapped to a standard atlas coordinate space. Registration to an atlas removes individual anatomical variation and allows information from many experiments to be combined and associated with a single conical anatomy.

Figure 1:
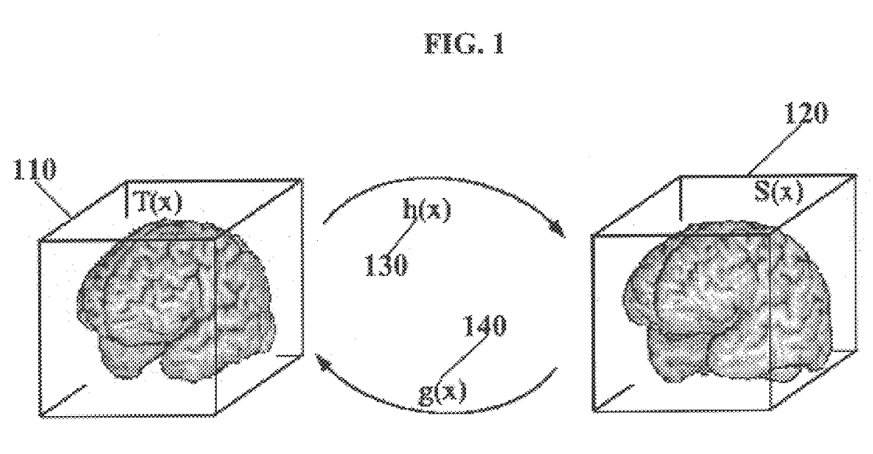
FIG. 1 depicts two image volumes and the transformations between them.

The forward transformation h $130$ from image volumes T $110$ to S $120$ and the reverse transformation g $140$ from S $120$ to T $110$ are depicted in FIG. 1. Ideally, the transformations h $130$ and g $140$ should be uniquely determined and should be inverses of one another. Estimating h $130$ and g $140$ independently very rarely results in a consistent set of transformations due to a large number of local minima. To overcome this deficiency in current registration systems, the present invention jointly estimate h $130$ and g $140$ while constraining these transforms to be inverses of one another. The invertibility constraint will reduce the number of local minima because the problem is being solved from two different directions. Although uniqueness is very difficult to achieve in medical image registration, the joint estimation should lead to more consistent and biologically meaningful results.

SUMMARY OF THE INVENTION

According to the teachings of the present invention, more meaningful results may be achieved over prior art registration methods and systems through registering images based upon joint estimation forward and reverse transformations. In this joint estimation, two image data sets are received, a source and a target. A current set of forward and reverse displacement fields are initialized. From the current set of forward and reverse displacement fields, the consistent forward and reverse transformations are jointly estimated. These transformations are outputted.

In one embodiment, the joint estimation of the forward and reverse transformation is based upon utilization of a symmetric cost function. In further embodiments, the symmetric cost function is combined with either an inverse consistency constraint function or a diffeomorphic constraint function to perform the joint estimation. In yet another embodiment, the symmetric cost function is combined with both an inverse consistency constraint function and a diffeormorphic constraint function to serve as a basis for the joint estimation of the forward and reverse transformations. In yet another embodiment, the diffeomorphic-constraint can be replaced by or combined with another regularization constraint that maintains desirable properties of the template (source) and target images when deformed. In yet another embodiment, all of the previously stated constraints can be combined with constraints that enforce correspondence between corresponding landmarks, contours, and surfaces in the template and target images.

DETAILED DESCRIPTION OF THE INVENTION

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The image registration problem is usually stated as finding the transformation h that maps the template image volume T into correspondence with the target image volume S. Alternatively, the problem can be stated as finding the transformation g that transforms S into correspondence with T. According to the present invention, the previous two statements are combined into a single problem and restated as jointly estimating the transformations h and g such that h maps T to S and g maps S to T subject to the constraint that $h=g^{-1}$. The image volumes T and S can be of any dimension such as 1D, 2D, 3D, 4D, or higher dimensional and in general can be multi-valued. These image volumes may be generally referred to as image data sets. Image data sets may represent information such as anatomical structures like the brain, heart, lungs, etc., or could represent symbolic information such as structure names, object features, curvature, brain function, etc, or could represent image frames in movies that need to be matched for morphing, interpolating transitional frames, etc., or images of a battle field with tanks, artillery, etc., or images collected from satellites or robots that need to be fused into a composite image, etc.

In a preferred embodiment, the 3D image volumes T and S are medical imaging modalities such as MRI, fMRI, CT, cryosection imagery, etc. collected from similar anatomical populations; however, the registration method according to the present invention may be meaningfully used for image data sets having other characteristics. Each image is defined as a function of $x \in \Omega=[0,1]^3$ where $\Omega$ is called the image coordinate system. The transformations are vector-valued functions that map the image coordinate system $\Omega$ to itself, i.e., h: $\Omega \to \Omega$ and g: $\Omega \to \Omega$. Diffeomorphic constraints are placed on h and g so that they preserve topology. It is assumed that:

$h(x)=x+u(x)$ $h^{-1}(x)=x+\tilde{u}(x)$ $g(x)=x+w(x)$ $g^{-1}(x)=x+\tilde{w}(x)$ where $h(h^{-1}(x))=x$ and $g(g^{-1}(x))=x$. All of the fields h, g, u, $\tilde{u}$, w and $\tilde{w}$ are (3×1) vector-valued functions of $x \in \Omega$.

Registration is defined using a symmetric cost function C(h,g) that describes the distance between the transformed template T(h) and target S, and the distance between the transformed target S(g) and template T. To ensure the desired properties, the transformations h and g are jointly estimated by minimizing the cost function C(h,g) while satisfying diffeomorphic constraints and inverse transformation consistency constraints. The diffeomorphic constraints are enforced by constraining the transformations to satisfy laws of continuum mechanics.

The main problem with image similarity registration techniques is that minimizing the similarity function does not uniquely determine the correspondence between two image volumes. In addition, similarity cost functions generally have many local minima due to the complexity of the images being matched and the dimensionality of the transformation. It is these local minima (ambiguities) that cause the estimated transformation from image T to S to be different from the inverse of the estimated transformation from S to T. In general, this becomes more of a problem as the dimensionality of the transformation increases.

To overcome this problem specifically for (3×3) linear transformations, prior art systems, such as described in Woods et al., Automated Image Registration: II. Intersubject Validation of Linear and Nonlinear Models, Journal of Computer Assisted Tomography, 22(1), 1998, compute all pairwise registrations of a population using a linear transformation model. They then average the transformation from A to B with all the transformations from A to X to B. The original transformation from A to B is replaced with average transformation. The procedure is repeated for all the image pairs until convergence. This technique is limited by the fact that it can not be apply to two data sets. Also, there is no guarantee that the generated set of consistent transformations is valid. For example, a poorly registered pair of images can adversely effect all of the pairwise transformations.

To overcome correspondence ambiguities, the transformations from image T to S and from S to T are jointly estimated. This is accomplished by defining a cost function to measure the shape differences between the deformed image T(h(x)) and image S(x) and the differences between the deformed image S(g(x)) and image T(x). Ideally, the transformations h and g should be inverses of one another, i.e., $h(x)=g^{-1}(x)$. The transformations h and g are estimated by minimizing a cost function that is a function of (T(h(x))−S(x)) and (S(g(x))−T(x)). The squared intensity difference cost function used in a preferred embodiment is given by Equation 1:

$$C_1(T(h), S) + C_1(S(g), T) = \int_\Omega |T(h(x))-S(x)|^2 dx + \int_\Omega |S(g(x))-T(x)|^2 dx$$

In practice, the images S and T are discrete and the integrals in Equation 1 are discretized and implemented as summations. Unlike the prior art systems dealing specifically with (3×3) linear transformations, this joint estimation approach applies to both linear and non-linear transformations.

Alternatively, other cost functions may be used such as the mutual information cost function described in F. Maes, A. Collignon, D. Vandermeulen, G. Marchal, and P. Suetens, "Multimodality image registration by maximization of mutual information," IEEE Transactions on Medical Imaging, 16(2):187–198, April, 1997 and in W. M. Wells III, P. Viola, H. Atsumi, S. Nakajima, and R. Kikinis, "Multi-modal volume registration by maximization of mutual information," Medical Image Analysis, 1(1): 35–51, 1996. The mutual information similarity function has the advantage of being able to specify the correspondence between images collected by the same or different imaging modalities. Without loss of generality, assume that the range of intensities that images T and S is given by the set $G=\{0, \ldots, 225\}$ and let $T_i(x)=\{1$ if $T(x)=i$ or $0$ otherwise$\}$ and $Si(x)=\{1$ if $S(x)=i$ or $0$ otherwise$\}$. The symmetric mutual information cost function is given by $$C_{MI}(h) + C_{MI}(g) = \sum_{i \in G} \sum_{j \in G} p_{ij} \log \frac{p_{ij}}{q_i r_j} + \sum_{i \in G} \sum_{j \in G} \tilde{p}_{ij} \log \frac{\tilde{p}_{ij}}{\tilde{q}_i \tilde{r}_j}$$

where $$p_{ij} = \int_\Omega T_i(h(x)) S_j(x) dx, \; \tilde{p}_{ij} = \int_\Omega S_i(g(x)) T_j(x) dx,$$

$$q_i = \sum_{j \in G} p_{ij} = \int_\Omega T_i(h(x)) dx, \; \tilde{q}_i = \sum_{j \in G} \tilde{p}_{ij} = \int_\Omega S_i(g(x)) dx,$$

$$\sum_{i \in G} p_{ij} = \int_\Omega S_j(x) dx, \text{ and } \tilde{r}_j = \sum_{i \in G} \tilde{p}_{ij} = \int_\Omega T_j(x) dx.$$

In practice, the images S and T are discrete and the integrals defining $p_{ij}$, $\tilde{p}_{ij}$, $q_{ij}$, $\tilde{q}_{ij}$, $r_{ij}$, $\tilde{r}_{ij}$ are implemented as summations.

Another similarity cost function that can be used is the intensity variance cost function described in R. P. Woods, J. C. Mazziotta, and S. R. Cherry, "MRI—PET Registration with Automated Algorithm", Journal of Computer Assisted Tomography, 17(4), 1993, pp. 536–546. The intensity variance cost function also has the advantage of being able to specify the correspondence between images collected by the same or different imaging modalities. The symmetric intensity variance cost function is given by $$C_{IV}(h, a) + C_{IV}(g, b) =$$
$$\sum_{i \in G} \int_\Omega S_i(x)(T(h(x)) - a_i)^2 dx + \sum_{i \in G} \int_\Omega T_i(x)(S(g(x)) - b_i)^2 dx$$

where the variables $a_i$ and $b_i$ are nuisance parameters and must be estimated. Setting the derivative of the cost function with respect to $a_i$ and $b_i$ equal to zero and solving for $a_i$ and $b_i$ gives $$a_i = \frac{\int_\Omega S_i(x) T(h(x)) dx}{\int_\Omega S_i(x) dx} \text{ and } b_i = \frac{\int_\Omega T_i(x) S(g(x)) dx}{\int_\Omega T_i(x) dx},$$

respectively. In practice, the images S and T are discrete and the integrals defining the intensity variance cost function are implemented as summations.

Still another example of a multi-modality similarity cost function is the squared intensity difference with an intensity mapping. Let T and S be image volumes that correspond to the same or different anatomies from the same population imaged by two different imaging modalities. Let f be a scalar function that takes intensities generated by imaging an object with the first imaging modality and maps them to their corresponding intensities as though the object was imaged by the second modality. In a similar fashion, define g to be the inverse mapping of f. The symmetric cost function in this case is given by $$C_{siwim}(T(h), S, f) + C_{siwim}(S(g), T, e) =$$
$$\int_\Omega |f(T(h(x))) - S(x)|^2 dx + \int_\Omega |e(S(g(x))) - T(x)|^2 dx$$

where f and e are intensity mapping functions. The functions f and e can either be specified in advance or jointly estimated with the transformations.

There are many similarity cost functions that use image features such as gradient magnitude, landmarks, edges, contours, and surfaces to define the correspondence between two images. There are numerous image processing techniques for extracting features from images. These features in turn can be used to define similarity cost functions. For example, the gradient magnitude of an image can be considered a feature. A symmetric similarity cost function based on the gradient magnitude feature could have a form such as:

$$C_f(T(h), S) + C_f(S(g), T) =$$
$$\int_\Omega |||\nabla(T(h(x)))|| - ||\nabla S(x)|||^2 dx + \int_\Omega |||\nabla(S(g(x)))|| - ||\nabla T(x)|||^2 dx.$$

Alternatively, the gradient magnitude feature can be replaced with edge features that are extracted from the images using any number of edge detectors such as a Canny filter, a Prewitt operator, Sobel operator, etc. In general, other similiarity cost functions may be constructed by taking the squared difference between corresponding image features and integrating over the domain $\Omega$.

A 3D Fourier series representation is used to parameterize the forward and inverse transformations. Each basis coefficient can be interpreted as the weight of a harmonic component in a single coordinate direction. The displacement fields are constrained to have the form of Equation 2:

$$u(x) = \sum_{k=0}^{N-1} \sum_{j=0}^{N-1} \sum_{i=0}^{N-1} \mu_{ijk} e^{j\langle x, \omega_{ijk} \rangle} \text{ and}$$

$$w(x) = \sum_{k=0}^{N-1} \sum_{j=0}^{N-1} \sum_{i=0}^{N-1} \eta_{ijk} e^{j\langle x, \omega_{ijk} \rangle}$$

where $\mu_{ijk}$ and $\eta_{ijk}$ are (3×1) complex-valued vectors and where $$\omega_{ijk} = \left[ \frac{2\pi i}{N}, \frac{2\pi j}{N}, \frac{2\pi k}{N} \right].$$

The parameter N in Equation 2 represents the number of harmonics or degrees of freedom of the displacement fields. In general, separate variables $N_1$, $N_2$, $N_3$ would be used to denote the degrees of freedom for each coordinate, i.e., the upper summation limits would be replaced with $N_1$, N2, $N_3$ and $$\omega_{ijk} = \left[ \frac{2\pi i}{N_1}, \frac{2\pi j}{N_2}, \frac{2\pi k}{N_3} \right].$$

During the estimation procedure, the upper limit of each summation in Equation 2 is replaced by $d_1$, $d_2$, $d_3$, respectively, in order to limit the number of harmonics where $0 \leq d_1 < N_1$, $0 \leq d_2 < N_2$, $0 \leq d_3 < N_3$. The parameters $d_1$, $d_2$, $d_3$ are incrementally increased during the estimation procedure. In the simplest case $d_1$, $d_2$, $d_3$ are initialized to all equal one and are incremented by one after a set number of iterations. In general, $d_1$, $d_2$, $d_3$ could be initialized with different values, be incremented after some convergence criteria, could be incremented by any amount, and could be incremented independent of each other.

The Fourier series parameterization is periodic in x and therefore has cyclic boundary conditions for x on the boundary of $\Omega$. The coefficients $\mu_{ijk}$ and $\mu_{ijk}$ are constrained to have complex conjugate symmetry during the estimation procedure. In practice, the continuous displacement fields are discretized for implementation.

Each displacement field in Equation 2 is real and can be written as the following:

$$u(x) = 2\sum_{k=0}^{N-1}\sum_{j=0}^{N-1}\sum_{i=0}^{N/2-1}\left(a_{ijk}\operatorname{Re}\left\{e^{j\langle x,\omega_{ijk}\rangle}\right\} - b_{ijk}\operatorname{Im}\left\{e^{j\langle x,\omega_{ijk}\rangle}\right\}\right) \quad \text{Equation 3}$$

if the (3×1) vector $\mu_{ijk} = a_{ijk} + \hat{j}_{ijk}$ has complex conjugate symmetry.

Minimizing the cost function in Equation 1 is not sufficient to guarantee that the transformations h and g are inverses of each other. The inverse transformation consistency constraint is enforced by minimizing the squared difference between the transformation h and the inverse transformation of g, and vice versa. To state this mathematically we define the following relationships:

$$h(x) = x + u(x)$$
$$h^{-1}(x) = x + \tilde{u}(x)$$
$$g(x) = x + w(x)$$
$$g^{-1}(x) = x + \tilde{w}(x)$$

The joint estimation approach presented here is independent of the transformation parameterization. It would be obvious to one skilled in the art that a variety of parameterizations may be used in alternate embodiments of the present invention. For example, the displacement fields can be parameterized in terms of a series of polynomials. A second order, 2D polynomial transformation is given by $$u(x) = \begin{bmatrix} a_0 + a_1 x_1 + a_2 x_2 + a_3 x_1^2 + a_4 x_1 x_2 + a_5 x_2^2 \\ b_0 + b_1 x_1 + b_2 x_2 + b_3 x_1^2 + b_4 x_1 x_2 + b_5 x_2^2 \end{bmatrix} \text{ and}$$

$$w(x) = \begin{bmatrix} c_0 + c_1 x_1 + c_2 x_2 + c_3 x_1^2 + c_4 x_1 x_2 + c_5 x_2^2 \\ d_0 + d_1 x_1 + d_2 x_2 + d_3 x_1^2 + d_4 x_1 x_2 + d_5 x_2^2 \end{bmatrix}$$

where a0, ..., a5, b0, ... b5, c0, ..., c5, d0, ..., d5 are the transformation parameters.is straightforward to extend the polynomial transformation model to 3D and higher dimensions as well as to include $3^{rd}$, $4^{th}$, and higher order polynomials. This parameterization reduces to the affine transformation when the highest order of the polynomials is one. For the polynomial model, the joint estimation procedure is the same as before except the Fourier basis model would be replaced with the polynomial transformation model.

Alternatively, a wavelet basis model could be substituted for the Fourier series transformation model. Let $\psi$ be a compactly supported wavelet as constructed in I. Daubechies, "Orthonormal bases of compactly supported wavelets," Communications of Pure and Applied Mathematics, vol. XLI, (1988), pp. 909–996, with support in [−R,R]. Let $\phi$ be the corresponding function which generates the multiresolution analysis. Define $$\psi_{nk}^P(x) = 2^{n/2}\sum_{l=-\infty}^{\infty}\psi(2^n(x-l)-k), \text{ and } \phi_{nk}^P(x) = 2^{n/2}\sum_{l=-\infty}^{\infty}\phi(2^n(x-l)-k),$$

for $0 \leq x \leq 1$. All the functions with superscript P are periodic with period 1, and if $k=2^n$ then $\psi_{nk}^P = \psi_{n0}^P$, and similarly for $\phi_{nk}^P$. In 2D, the displacement fields represented by the wavelet basis are given by $$u(x) = \sum_{n=0}^{\infty}\sum_{k,l=0}^{2^n-1} a_{nkl}\Psi_{nkl}^{P,a}(x) + b_{nkl}\Psi_{nkl}^{P,b}(x) + c_{nkl}\Psi_{nkl}^{P,c}(x) + d_{nkl}\Phi_{nkl}^P(x) \text{ and}$$

$$w(x) = \sum_{n=0}^{\infty}\sum_{k,l=0}^{2^n-1} e_{nkl}\Psi_{nkl}^{P,a}(x) + f_{nkl}\Psi_{nkl}^{P,b}(x) + g_{nkl}\Psi_{nkl}^{P,c}(x) + h_{nkl}\Phi_{nkl}^P(x)$$

where $a_{nkl}, \ldots, h_{nkl}$ are the basis parameters and $\Psi_{nkl}^{P,a}(x) = \phi_{nk}^P(x_1)\psi_{nl}^P(x_2)$, $\Psi_{nkl}^{P,b}(x) = \psi_{nk}^P(x_1)\phi_{nl}^P(x_2)$, $\Psi_{nkl}^{P,c}(x) = \psi_{nk}^P(x_1)\psi_{nl}^P(x_2)$, and $\Phi_{nkl}^P(x) = \phi_{nk}^P(x_1)\phi(x_2)$. It is straightforward to extend the wavelet basis to 3D, 4D, etc., and to use other wavelets besides the Daubechies. When working with discrete data, one can use the discrete wavelet transform as in S. Mallat, "A theory for multiresolution signal decomposition: the wavelet representation," IEEE Transactions on Pattern Analysis And Machine Intelligence, 11, 1989, pp. 674–693. Again, nothing but the parameterization would change in the joint estimation.

The discrete cosine transform (DCT) is another approach that has been used to parameterize the displacement field as described in J. Ashburner et al., "Spatial Normalization", Brain Warping, ed. A. Toga, Academic Press, 1999, pp. 27–44. In 2D without loss of generality, assume that the images T and S consist of J×J pixels. The x and y components of forward displacement field are computed at each pixel location as the matrices $B_1^T A_1 B_2$ and, $B_1^T A_2 B_2$ respectively. The transformation parameters are the elements of the M×M matrices $A_1$ and $A_2$ where $1 \leq M \leq J$ is the highest order of the DCT. For square images, the elements of the M×J matrices $B_1 = B_2$ are defined by $b_{m,1} = 1/\sqrt{M}$, m=1, ..., M and $$b_{m,j} = \sqrt{\frac{2}{M}}\cos\left(\frac{\pi(2m-1)(j-1)}{2M}\right)$$

m=1, ..., Mj=2, ..., J. The reverse transformation is parameterized in a similar fashion. The DCT can also be extended 3D and higher dimensions.

Discretizing the displacement field on a lattice in $R^3$ is another way the transformation may be parameterized as described in M. I. Miller et al., "Mathematical Textbook of Deformable Neuroanatomies", Proceedings of the National Academy of Sciences, 90(24), 1993, pp. 11944–48. In this case, the parameterization is given by samples of the displacement fields $$a_{ijk} = u\left(\frac{i}{N_1}, \frac{j}{N_2}, \frac{k}{N_3}\right) \text{ and } b_{ijk} = w\left(\frac{i}{N_1}, \frac{j}{N_2}, \frac{k}{N_3}\right)$$

for $0 \leq i < N_1, 0 \leq j < N_2, 0 \leq k < N_3$ located at the voxel locations of the images where $a_{ijk}$ and $b_{ijk}$ are (3×1) vectors) and the images have dimensions $N_1 \times N_2 \times N_3$. These samples of the displacement field are sufficient to transform the image volumes since the image volumes are also discrete. The samples of the displacement fields can be extended to the continuum using trilinear interpolation or can be resampled at any resolution using trilinear interpolation.

The consistency constraint is enforced by minimizing Equation 4:

$$C_2(u, \tilde{w}) + C_2(w, \tilde{u}) = \int_\Omega \|u(x) - \tilde{w}(x)\|^2 dx + \int_\Omega \|w(x) - \tilde{u}(x)\|^2 dx$$

The inverse transformation $h^{-1}$ is estimated from h by solving the minimization problem $$h^{-1}(y) = \underset{x}{\operatorname{argmin}} \|y - h(x)\|^2$$

for each y on a discrete lattice in $\Omega$. The inverse $h^{-1}$ exists and is unique if h is a diffeomorphic transformation, i.e., continuous, one-to-one, and onto.

Minimizing the cost function in Equation 4 does not ensure that the transformations h and g are diffeomorphic transformations except for when $C_2(u, \tilde{w}) + C_2(w, \tilde{u}) = 0$. To enforce the transformations to be diffeomorphic, continuum mechanical models such as linear elasticity, viscous fluid, etc. are used. In a preferred embodiment, a linear-elastic constraint of the form (Equation 5):

$$C_3(u) + C_3(w) = \int_\Omega \|Lu(x)\|^2 dx + \int_\Omega \|Lw(x)\|^2 dx$$

is used to enforce the diffeomorphic property where $h(x) = x + u(x)$ and $g(x) = x + w(x)$. The operator L has the form $Lu(x) = -\nabla^2 u(x) - \beta \nabla (\nabla \cdot u(x)) + \gamma$ for linear elasticity, but in general can be any nonsingular linear differential operator.

The operator L can be considered a (3×3) matrix operator. Discretizing the continuous partial derivatives of L, it can be shown that Equation 5 has the form (Equation 6):

$$C_3(u) + C_3(w) = N^3 \sum_{k=0}^{N-1} \sum_{j=0}^{N-1} \sum_{i=0}^{N-1} \mu_{ijk}^\dagger D_{ijk}^2 \mu_{ijk} + \eta_{ijk}^\dagger D_{ijk}^2 \eta_{ijk}$$

where † is the complex conjugate transpose. $D_{ijk}$ is a real-valued, (3×3) matrix with elements:

$$d_{11} = 2\alpha \left[ \beta \left(1 - \cos\left(\frac{2\pi i}{N}\right)\right) + \left(1 - \cos\left(\frac{2\pi j}{N}\right)\right) + \left(1 - \cos\left(\frac{2\pi k}{N}\right)\right) \right] + \gamma$$

$$d_{22} = 2\alpha \left[ \left(1 - \cos\left(\frac{2\pi i}{N}\right)\right) + \beta \left(1 - \cos\left(\frac{2\pi j}{N}\right)\right) + \left(1 - \cos\left(\frac{2\pi k}{N}\right)\right) \right] + \gamma$$

$$d_{33} = 2\alpha \left[ \left(1 - \cos\left(\frac{2\pi i}{N}\right)\right) + \left(1 - \cos\left(\frac{2\pi j}{N}\right)\right) + \beta \left(1 - \cos\left(\frac{2\pi k}{N}\right)\right) \right] + \gamma$$

$$d_{12} = d_{21} = \beta \left[ \cos\left(\frac{2\pi}{N}(i-j)\right) - \cos\left(\frac{2\pi}{N}(i+j)\right) \right]$$

$$d_{13} = d_{31} = \beta \left[ \cos\left(\frac{2\pi}{N}(i-k)\right) - \cos\left(\frac{2\pi}{N}(i+k)\right) \right]$$

$$d_{23} = d_{32} = \beta \left[ \cos\left(\frac{2\pi}{N}(j-k)\right) - \cos\left(\frac{2\pi}{N}(j+k)\right) \right]$$

The purpose of the diffeomorphic constraint is to ensure that the transformations maintain the topology of the images T and S. Thus, the diffeomorphic constraint can be replaced by or combined with other regularization constraints that maintains desirable properties of the template (source) and target when deformed. An example would be a constraint that prevented the Jacobian of both the forward and reverse transformations from going to zero or infinity. A constraint of this type that penalizes low and high Jacobian values is given by $$C_4(h) + C_4(g) = \int_\Omega (J(h(x)))^2 + \left(\frac{1}{J(h(x))}\right)^2 + (J(g(x)))^2 + \left(\frac{1}{J(g(x))}\right)^2 dx$$

where J denotes the Jacobian operator.

By combining Equations 1, 4 and 5 the image registration problem becomes as follows (Equation 7):

$$\hat{h}(x), \hat{g}(x) = \underset{h(x), g(x)}{\operatorname{argmin}} \int_\Omega |T(h(x)) - S(x)|^2 + |S(g(x)) - T(x)|^2 dx +$$

$$\lambda \int_\Omega \|u(x) - \tilde{w}(x)\|^2 + \|w(x) - \tilde{u}(x)\|^2 dx +$$

$$\rho \int_\Omega \|Lu(x)\|^2 + \|Lw(x)\|^2 dx$$

where the constants $\lambda$ and $\rho$ are Lagrange multipliers used to enforce/balance the constraints. It is well known that Equation 7 can be solved either by minimizing the combined cost as done in the preferred embodiment presented here or by solving the partial differential equation that minimizes the combined cost. The partial differential equation that minimizes the combined cost can be computed using calculus of variation methods.

The presented method can be generalized to include additional correspondence constraint terms in Equation 7 that constrain the transformations to maintain correspondence defined by landmarks, contours, and surfaces. For example, suppose that images T and S have N corresponding landmarks denoted by $p_i \in \Omega$ and $q_i \in \Omega$. respectively, for $0 \leq i < N$. This information can be included in the joint estimation by adding the cost functions $$C_{landmark}(h) + C_{landmark}(g) = \alpha \sum_{i=0}^{N-1} (p_i - h(q_i))^2 + (q_i - g(p_i))^2$$

to Equation 7 where $\alpha$ is another Lagrange multiplier. Likewise, a cost function can be added to enforce the constraint that corresponding contours are matched. Assume there are M corresponding contours in images T and S and a line connecting N equally spaced landmarks constructs each contour. Let $p_{ij}$ and $q_{ij}$ denote the landmarks that construct the contours in T and S, respectively, $0 \leq i < N$. $0 \leq j < M$. This corresponding contour information can be included in the joint estimation by adding the cost functions $$C_{contour}(h) + C_{contour}(g) = \beta \sum_{i=0}^{N-1} \sum_{j=0}^{M-1} (p_{ij} - h(q_{ij}))^2 + (q_{ij} - g(p_{ij}))^2$$

to Equation 7 where $\beta$ is another Lagrange multiplier. Finally, assume that there are M' corresponding surfaces in images T and S denoted by $\gamma_i(u, v)$ and $\eta_i(u, v)$, respectively, $0 \leq i < M'$. In this case, correspondence is defined as the point $\gamma_i(u,v)$ corresponding to the point $\eta_i(u,v)$ for each pair $(u, v)$. This corresponding surface information can be included in the joint estimation by adding the cost functions $$C_{surface}(h) + C_{surface}(g) = \sigma \sum_{i=0}^{M'-1} \int\int (\gamma_i(u,v) - h(\eta_i(u,v)))^2 + (\eta_i(u,v) - g(\gamma_i(u,v)))^2 du\, dv$$

to Equation 7 where $\sigma$ is another Lagrange multiplier.

Figure 2:
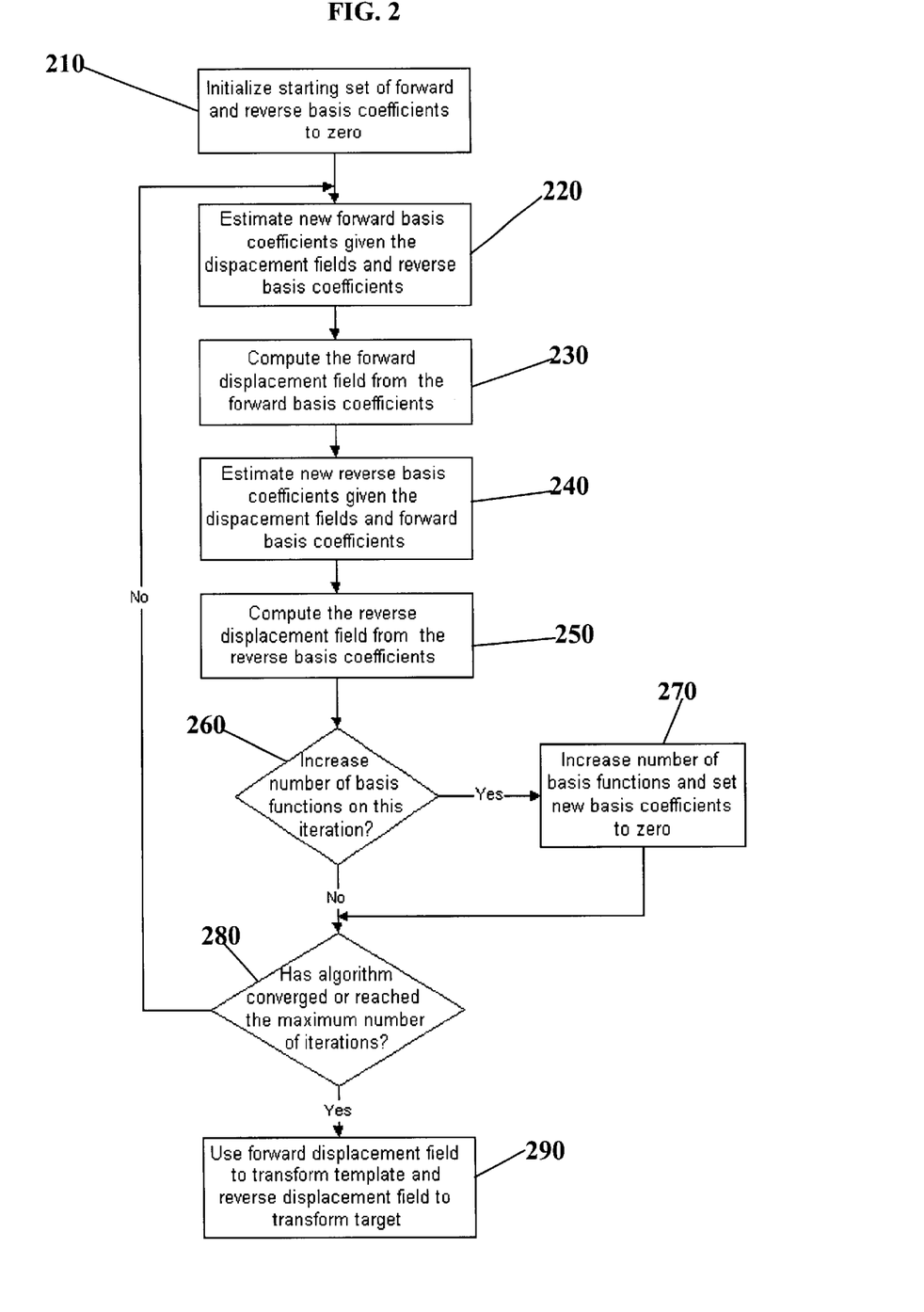
FIG. 2 is a flowchart of steps in a registration according to the present invention.

FIG. 2 is a flowchart of an embodiment of the joint estimation of registration between two images according to the present invention. An initialization occurs in step 210 by setting the forward and reverse basis coefficients to zero. Steps 220–250 perform a joint estimation of the forward and reverse basis coefficients. In step 220, new forward basis coefficients are estimated from the current displacement fields and the current reverse basis coefficients. From these estimated forwarded basis coefficients, a forward displacement field is computed in step 230. With the current displacement fields and the current forward basis coefficients, step 240 estimates new reverse basis coefficients from which a reverse displacement field is computed in step 250.

The forward and reverse transformations are estimated by minimizing the cost function in equation 7. The first minimization component is the symmetric cost function. The symmetric cost function measures the shape difference between the source image and the deformed target image. An appropriate symmetric cost function according to the present invention is stated mathematically in Equation 1. Other functions could be used such as the mutual information cost function or minimum intensity variance cost function. This component, however, does not guarantee that the forward and the reverse transformations are inverses of each other nor does it guarantee that these transformations are diffeomorphic. The possession of either property alone or both together by the transformations yields significant meaningful advantages in many areas of imaging technology.

These properties are enforced through adding additional minimization terms during the estimation process. For enforcing the inverse transformation consistency constraint, a function such as presented in Equation 4 is utilized during the estimation process. For enforcing the diffeomorphic constraint, a continuum mechanical model is used such as linear elasticity, viscous fluid, thin-plate spline, membrane model, plastic model, etc. In a preferred embodiment, minimizing a linear-elastic constraint of the form of Equation 5 is used to impose the diffeomorphic constraint. In the situation where both properties are desirable, a unified cost function may be used to enforce and balance the three cost constraints. In a preferred embodiment, Equation 7 is used as the unified cost function.

The estimation occurs in an iterative fashion. The steps 220–250 are executed repeatedly until step 280 determines that either a convergence has occurred or that the maximum number or iterations has been reached. During the iterative process, after each execution of steps 220–250 a determination is made in step 260 as to whether to increase the number of basis functions. If this determination is decided affirmatively, step 270 increases the number of basis functions and initializes the new basis coefficients to zero. Once an affirmative determination occurs at step 280, the process ends in step 290 yielding the desired forward and reverse transformations which are used to transform the source and target images respectively.

The present invention may be implement on one or more general purpose computers having storage systems to facilitate manipulation of image data sets. For example, the results that are presented below were computed on a Silicon Graphics Onyx2 computer with one R10000, 180 MHz processor.

Two MRI and two CT image volumes were used to evaluate the registration method and system according to the present invention. The data sets were collected from different individuals using the same MR and CT machines and the same scan parameters. The MRI data sets correspond to two normal adults and the CT data sets correspond to two 3-month-old infants, one normal and one abnormal (bilateral coronal synostosis). The MRI and CT data sets were chosen to test registration algorithm when matching anatomies with similar and dissimilar shapes, respectively.

The MRI data were preprocessed by normalizing the image intensities, correcting for translation and rotation, and segmenting the brain from the head using Analyze™. The translation aligned the anterior commissure points, and the rotation aligned the corresponding axial and sagittal planes containing the anterior and posterior commissure points, respectively. The data sets were then down-sampled and zero padded to form a 64×64×80 voxel lattice. The CT data sets were corrected for translation and rotation and down-sampled to form a 64×64×48 voxel lattice. The translation aligned the basion skull landmarks, and the rotation aligned the corresponding Frankfort Horizontal and midsagittal planes, respectively.

The data sets were registered initially with zero and first order harmonics. After every fortieth iteration, the maximum harmonic was increased by one. The MRI-to-MRI registration was terminated after 300 iterations and the CT-to-CT registration was terminated after 200 iterations.

Tables 1, 2 and 3 show the results of four MRI experiments and four CT experiments. In order to isolate the contribution of each term of Equation 7, one experiment was done with no priors, one with the linear-elastic model, one with the inverse consistency constraint, and one with both priors. The four MRI experiments used the parameters:

1. $\lambda = \rho = 0$,
2. $\lambda = 0$ and $\rho = 50$,
3. $\lambda = 0.07$ and $\rho = 0$, and
4. $\lambda = 0.07$ and $\rho = 50$;

and four CT experiments used the parameters:

1. $\lambda = \rho = 0$,
2. $\lambda = 0$ and $\rho = 25$,
3. $\lambda = 0.02$ and $\rho = 0$, and
4. $\lambda = 0.02$ and $\rho = 25$.

The labels MRI1 and CT1 are used to refer to results from the Case 1 experiments, and likewise for 2 to 4.

TABLE 1

Cost Terms Associated with Transforming T to S

| Experiment | $C_1(T(h),S)$ Original | $C_1(T(h),S)$ Final | $\lambda C_2(u, \tilde{w})$ Final | $\rho C_3(u)$ Final | Total |
|---|---|---|---|---|---|
| MRI1 | 1980 | 438 | 0 | 0 | 438 |
| MRI2 | 1980 | 606 | 0 | 85.7 | 692 |
| MRI3 | 1980 | 482 | 33.4 | 0 | 516 |
| MRI4 | 1980 | 639 | 13.0 | 74.6 | 727 |
| CT1 | 454 | 27.0 | 0 | 0 | 27.0 |
| CT2 | 454 | 38.8 | 0 | 28.1 | 66.9 |
| CT3 | 454 | 28.5 | 3.15 | 0 | 31.6 |
| CT4 | 454 | 40.8 | 3.34 | 28.3 | 72.4 |

TABLE 2

Cost Terms Associated with Transforming S to T

| | $C_1(S(g),T)$ | | $\lambda C_2(w, \tilde{u})$ | $\rho C_3(w)$ | |
| --- | --- | --- | --- | --- | --- |
| Experiment | Original | Final | Final | Final | Total |
| MRI1 | 1980 | 512 | 0 | 0 | 512 |
| MRI2 | 1980 | 660 | 0 | 78.3 | 738 |
| MRI3 | 1980 | 539 | 33.6 | 0 | 573 |
| MRI4 | 1980 | 676 | 13.0 | 73.7 | 727 |
| CT1 | 454 | 30.6 | 0 | 0 | 30.6 |
| CT2 | 454 | 47.7 | 0 | 32.4 | 80.1 |
| CT3 | 454 | 34.6 | 3.43 | | 38.0 |
| CT4 | 454 | 50.8 | 3.78 | 31.9 | 86.5 |

TABLE 3

Transformation Measurements

| | Jacobian (h) | | Jacobian (g) | | | |
| --- | --- | --- | --- | --- | --- | --- |
| Exp. | Min. | Max. | Min. | Max. | $C_2(u, \tilde{w})$ | $C_2(w, \tilde{u})$ |
| MRI1 | 0.257 | 0.275 | 0.100 | 0.261 | 28,300 | 29,500 |
| MRI2 | 0.521 | 0.459 | 0.371 | 0.653 | 10,505 | 10,460 |
| MRI3 | 0.315 | 0.290 | 0.226 | 0.464 | 478 | 479 |
| MRI4 | 0.607 | 0.490 | 0.410 | 0.640 | 186 | 186 |
| CT1 | 0.340 | 0.325 | 0.200 | 0.49 | 73,100 | 76,400 |
| CT2 | 0.552 | 0.490 | 0.421 | 0.678 | 28,700 | 28,300 |
| CT3 | 0.581 | 0.361 | 0.356 | 0.612 | 158 | 171 |
| CT4 | 0.720 | 0.501 | 0.488 | 0.725 | 167 | 189 |

Case 1 corresponds to unconstrained estimation in which h and g are estimated independently. The numbers in the tables are consistent with this observation. First, $C_2(u, \tilde{w})$ and $C_2(w, \tilde{u})$ show the largest error between the forward and inverse mapping for each group of experiments. Secondly, the Jacobian for these cases are the lowest in their respective groups. This is expected because the unconstrained experiments find the best match between the images without any constraint preventing the Jacobian from going negative (singular). This is further supported by the fact that the final values of $C_1(T(h),S)$ and $C_1(S(g),T)$ are the lowest in there groups.

Case 2 corresponds to independently estimating h and g while requiring each transformation to satisfy the diffeomorphic constraint enforced by linear elasticity. Just as in Case 1, the large difference between the forward and reverse displacement fields as reported by $C_2(u, \tilde{w})$ and $C_2(w, \tilde{u})$ confirms that linear elasticity alone does not guarantee that h and g are inverses of one another. The linear elasticity constraint did improve the transformations over the unconstrained case because the minimum Jacobian and the inverse of the maximum Jacobian are closer to one implying that the transformations are farther from being singular.

Case 3 corresponds to the estimation problem that is constrained only by the inverse transformation consistency constraint. The $C_2(u, \tilde{w})$ and $C_2(w, \tilde{u})$ values for these experiments are much lower than those in Cases 1 and 2 because they are being minimized. The transformations h and g are inverses of each other when $C_2(u, \tilde{w})+C_2(w, \tilde{u})=0$ so that the smaller the costs $C_2(u, \tilde{w})$ and $C_2(u, \tilde{w})$ are, the closer h and g are to being inverses of each other.

Case 4 is the joint estimation of h and g with both the inverse consistency constraint and the linear-elastic constraint. This produced the best results because the differences between the inverse transformations were so small, i.e., $C_2(u, \tilde{w})$ and $C_2(w, \tilde{u})$. Also, the minimum Jacobian of h is nearly the inverse of the maximum Jacobian of g, and vice versa. In addition, the minimum and one over the maximum Jacobian of h and g have their largest values for this experiment (excluding one entry from MRI2). The MRI4 experiment shows a better than twofold improvement over MRI3 with respect to the difference in the inverse transformations, while the inverse transformations difference for the CT4 and CT3 experiments are nearly equal. This may suggest that the inverse consistency constraint may be used without the linear-elasticity constraint. However, the minimum and one over the maximum Jacobian values are larger for CT4 than CT3 and similarly for MR14 and MRI3 suggesting less distortion. The closer the minimum Jacobian is to one, the smaller the distortion of the images.

Figure 3:
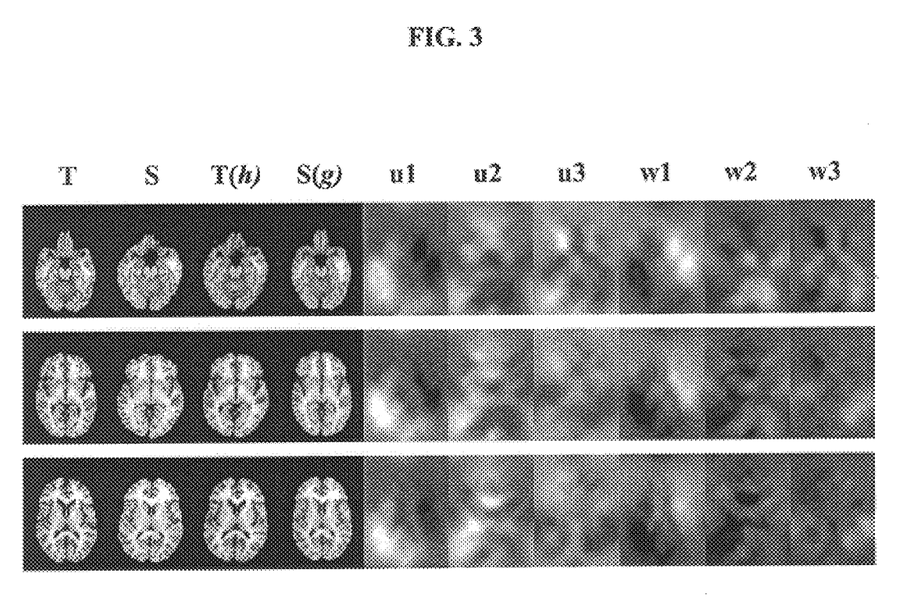
FIG. 3 depicts three slices from the MRI experimental results.
Figure 4:
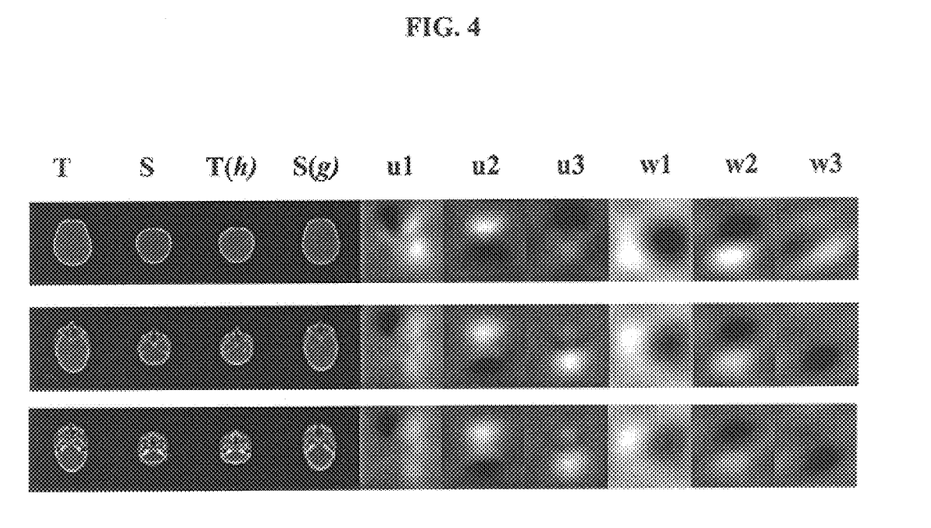
FIG. 4 depicts three slices from the CT experimental results.

FIGS. 3 and 4 shows three slices from the 3D result of Case 4 for the MRI and CT experiments, respectively. The first two columns show the template T and target S images before transformation. The third and forth columns show the transformed template T(h) and target S(g). Columns 5, 6, and 7 show the x-,y-, and z-components of the displacement field u used to deform the template and columns 8, 9, and 10 show the same for the displacement field w. The near invertibility in gray-scale between the displacement fields u and w gives a visual impression that h and g are nearly inverses of each other.

Figure 5:
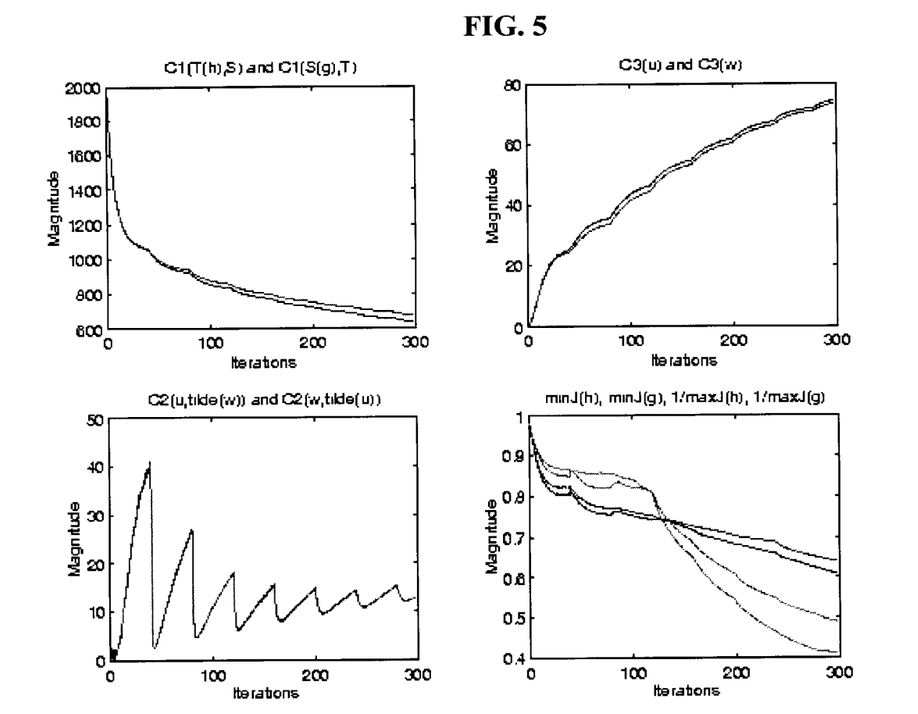
FIG. 5 displays graphs presenting statistics associated with the MRI4 experiment.
Figure 6:
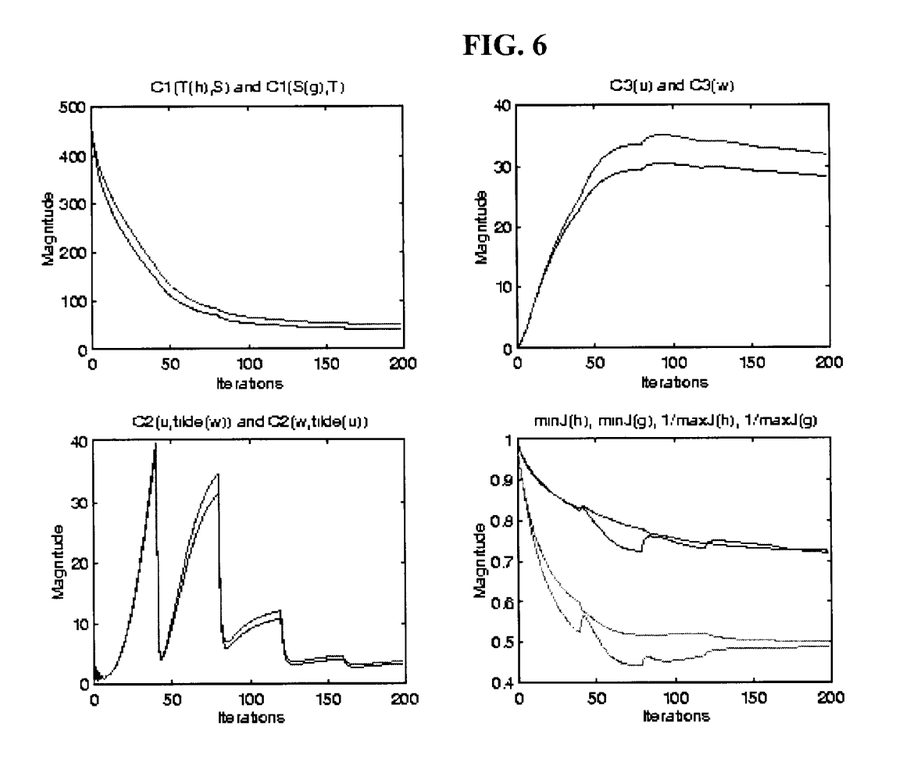
FIG. 6 displays graphs presenting statistics associated with the CT4 experiment.

The time series statistics for MRI4 and CT4 experiments are shown in Figures FIGS. 5 and 6 respectively. These graphs show that the gradient descent algorithm converged for each set of transformation harmonics. In both cases, the cost functions $C_1(T(h),S)$ and $C_1(S(g),T)$ decreased at each iteration while the prior terms increased before decreasing. The inverse consistency constraint increased as the images deformed for each particular harmonic resolution. Then when the number of harmonics were increased, the inverse constraint decreased before increasing again. This is due to the fact that a low-dimensional Fourier series does not have enough degrees of freedom to faithfully represent the inverse of a low-dimensional Fourier series. This is easily seen by looking at the high dimensionality of a Taylor series representation of the inverse transformation. Finally, the inverse consistency constraint caused the extremal Jacobian values of the forward and reverse transformations to track together. This is easiest to see in the CT4 experiment. These extremal Jacobian values correspond to the worst case distortions produced by the transformations.

The experiments were designed to test the registration method and system according to the present invention. As such, there was no effort made to optimize the rate of convergence of the algorithm. The convergence rate of the algorithm can be greatly improved by using a more efficient optimization technique than gradient descent such as conjugate gradient at each parameterization resolution. In addition, a convergence criteria can be used to determine when to increment the number of parameters in the model. The CT data used in the experiments was selected to stress the registration algorithm. The convergence of the algorithm would have been much faster if the data sets were adjusted for global scale initially.

It is important to track both the minimum and maximum values of the Jacobian during the estimation procedure. The Jacobian measures the differential volume change of a point being mapped through the transformation. At the start of the estimation, the transformation is the identity mapping and therefore has a Jacobian of one. If the minimum Jacobian goes negative, the transformation is no longer a one-to-one mapping and as a result folds the domain inside out. Conversely, the reciprocal of the maximum value of the Jacobian corresponds to the minimum value of the Jacobian of the inverse mapping. Thus, as the maximum value of the Jacobian goes to infinity, the minimum value of the Jacobian of the inverse mapping goes to zero. In the present approach, the inverse transformation consistency constraint was used to penalize transformations that deviated from their inverse transformation. A limitation of this approach is that cost function in Equation 4 is an average metric and can not enforce the pointwise constraints that $$\min_x\{J(h)\} = 1 \Big/ \max_x\{J(g)\} \text{ and } \min_x\{J(g)\} = 1 \Big/ \max_x\{J(h)\}.$$

This point is illustrated in Table 3 by the fact that the minimum values of J(h) and J(g) differ from the reciprocal of the maximum values of J(g) and J(h), respectively. However, these extremal Jacobian values do give an upperbound on the worst case distortions produced by the transformations demonstrating the consistency between the forward and reverse transformations.

The embodiments described above are given as illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A method for generating consistent image registration between a first image and a second image, comprising the steps of:
   (a) receiving a first image data set and a second image data set;
   (b) initializing a current forward transformation and a current reverse transformation;
   (c) computing an inverse of the current forward transformation and an inverse of the current reverse transformation;
   (d) jointly estimating a consistent forward and a consistent reverse transformation between the first image data set and the second image data set by minimizing a difference between the current forward transformation and the inverse of the current reverse transformation and minimizing a difference between the current reverse transformation and the inverse of the current forward transformation; and
   (e) outputting the jointly estimated forward and the reverse transformations.

2. The method of claim 1 wherein the step of jointly estimating a consistent forward and a consistent reverse transformation comprises the substeps of:
   (i) computing a new consistent forward transformation; and
   (ii) computing a new consistent reverse transformation.

3. The method of claim 2, wherein the step of jointly estimating a consistent forward and a consistent reverse transformation comprises the further substeps of:
   (iii) setting the current forward transformation to the new consistent forward transformation;
   (iv) setting the current reverse transformation to the new consistent reverse transformation; and
   (v) repeating substeps (i)–(iv) until a predetermined condition is met.

4. The method of claim 3 wherein the predetermined condition is reaching a selected maximum number of repetitions.

5. The method of claim 3 wherein the predetermined condition is attaining a selected level of convergence.

6. The method of claim 3, wherein the step of initializing a current forward and a current reverse transformation further comprises initializing a current set of forward parameters and a current set of reverse parameters and wherein the substeps of computing the new consistent forward transformation and the new consistent reverse transformation are respectively performed based upon estimating a new set of forward parameters and a new set of reverse parameters for the transformation.

7. The method of claim 6, wherein the substep of setting the current forward transformation to the new consistent forward transformation further comprises setting the current set of forward parameters to the new set of forward parameters and wherein the substep of setting the current reverse transformation to the new consistent reverse transformation further comprises setting the current set of reverse parameters to the new set of reverse parameters.

8. The method of claim 7 wherein the step of jointly estimating a consistent forward and a consistent reverse transformation comprises the following substeps performed after substeps (i)–(iv) but prior to repetition in substep (v):
   (vi) determining whether to increase a number of degrees of freedom;
   (vii) increasing the number of degrees of freedom;
   (viii) initializing a new set of forward transformation parameters and a new set of reverse transformation parameters based upon the increased number of degrees of freedom;
   (ix) adding the new set of forward transformation parameters to the current set of forward transformation parameters; and
   (x) adding the new set of reverse transformation parameters to the current set of reverse transformation parameters.

9. The method of claim 8 wherein the forward parameters are forward basis coefficients and the reverse parameters are reverse basis coefficients.

10. The method of claim 1 wherein the step of jointly estimating a consistent forward and a consistent reverse transformation estimates the forward and the reverse transformation utilizing a symmetric cost function and an inverse consistency constraint.

11. The method of claim 10 wherein the symmetric cost function is a mutual information cost function.

12. The method of claim 10 wherein the symmetric cost function is based upon a squared intensity difference cost function.

13. The method of claim 12 wherein the squared intensity difference cost function incorporates an intensity mapping function.

14. The method of claim 10 wherein the symmetric cost function is based upon an intensity variance cost function.

15. The method of claim 10 wherein the symmetric cost function is based upon matching features in the first image data set and the second image data set.

16. The method of claim 15 wherein the features conform to edges in the first image data set and the second image data set.

17. The method of claim 15 wherein the features conform to the gradient magnitude of the first image data set and the second image data set.

18. The method of claim 15, wherein the features conform to manifolds in the first image data set and the second image data set, wherein each image data set has a dimension, and wherein the manifold in the first image data set is of a dimension lesser than or equal to the dimension of the first image data set and the manifold in the second image data set is of a dimension lesser than or equal to the dimension of the second image data set.

19. The method of claim 18, wherein the manifolds are landmarks in the first image data set and the second image set.

20. The method of claim 18, wherein the manifolds are contours in the first image data set and the second image data set.

21. The method of claim 18, wherein the manifolds are subvolumes in the first image data set and the second image data set.

22. The method of claim 18, wherein the manifolds are surfaces in the first image data set and the second image data set.

23. The method of claim 10 wherein the step of jointly estimating a consistent forward and a consistent reverse transformation estimates the forward and the reverse transformation also utilizing a diffeomorphic constraint function.

24. The method of claim 23 wherein the diffeomorphic constraint function conforms to a regularization constraint.

25. The method of claim 23 wherein the diffeomorphic constraint function conforms to a linear differential operator constraint.

26. The method of claim 23 wherein the diffeomorphic constraint function conforms to a continuum mechanical model.

27. The method of claim 23 wherein the continuum mechanical model is a linear elasticity model.

28. The method of claim 10 wherein the step of jointly estimating a consistent forward and a consistent reverse transformation estimates the forward and the reverse transformation also utilizing a correspondence constraint function.

29. The method of claim 28, wherein the correspondence constraint function conforms to corresponding manifolds in the first image data set and the second image data set, wherein each image data set has a dimension, and wherein the manifold in the first image data set is of a dimension lesser than or equal to the dimension of the first image data set and the manifold in the second image data set is of a dimension lesser than or equal to the dimension of the second image data set.

30. The method of claim 29, wherein the manifolds are subvolumes in the first image data set and the second image data set.

31. The method of claim 29, wherein the manifolds are landmarks in the first image data set and the second image data set.

32. The method of claim 29, wherein the manifolds are contours in the first image data set and the second image data set.

33. The method of claim 29, wherein the manifolds are surfaces in the first image data set and the second image data set.

34. The method of claim 10 wherein the step of jointly estimating a consistent forward and a consistent reverse transformation estimates the forward and the reverse transformation also utilizing a diffeomorphic constraint function and a correspondence constraint function.

35. The method of claim 1, comprising the further step of:
(f) transforming the first image data set with the forward transformation and transforming the second image data set with the reverse transformation.

36. The method of claim 35, comprising the further step of:
(g) outputting the transformed first image data set and the transformed second image data set.

37. A system for generating consistent image registration between a first image data set and a second image data set comprising:
(a) a data storage system that stores one or more image data sets;
(b) one or more processor in communication with the data storage system for performing the steps comprising:
(i) receiving a first image data set and a second image data set;
(ii) initializing a current forward transformation and a current reverse transformation;
(iii) computing an inverse of the current forward transformation and an inverse of the current reverse transformation:
(iv) jointly estimating a consistent forward and a consistent reverse transformation between the first image data set and the second image data set by minimizing a difference between the current forward transformation and the inverse of the current reverse transformation and minimizing a difference between the current reverse transformation and the inverse of the current forward transformation; and
(v) outputting the jointly estimated forward and the reverse transformations.

38. The system of claim 37, wherein the processor performs the further step of:
(vi) transforming the first image data set with the forward transformation and transforming the second image data set with the reverse transformation.

39. The system of claim 38, wherein the processor performs the further step of:
(vii) outputting the transformed first image data set and the transformed second image data set.

40. The system of claim 37, wherein the processor jointly estimates a consistent forward and a consistent reverse transformation by performing the substeps of:
(A) computing a new consistent forward transformation; and
(B) computing a new consistent reverse transformation.

41. The system of claim 40, wherein the processor jointly estimates a consistent forward and a consistent reverse transformation by performing the further substeps of:
(C) setting the current forward transformation to the new consistent forward transformation;
(D) setting the current reverse transformation to the new consistent reverse transformation; and
(E) repeating substeps (A)–(D) until a predetermined condition is met.

42. The system of claim 37, wherein the processor jointly estimates a consistent forward and a consistent reverse transformation utilizing a symmetric cost function and an inverse consistency constraint.

43. The system of claim 42 wherein the processor jointly estimates a consistent forward and a consistent reverse transformation also utilizing a correspondence constraint function.

44. The system of claim 43, wherein the correspondence constraint function conforms to corresponding manifolds in the first image data set and the second image data set, wherein each image data set has a dimension, and wherein the manifold in the first image data set is of a dimension lesser than or equal to the dimension of the first image data set and the manifold in the second image data set is of a dimension lesser than or equal to the dimension of the second image data set.

45. The system of claim 42, wherein the processor jointly estimates a consistent forward and a consistent reverse transformation also utilizing a diffeomorphic constraint function and a correspondence constraint function.

46. The system of claim 42, wherein the processor jointly estimates a consistent forward and a consistent reverse transformation also utilizing a diffeomorphic constraint function.

47. A computer-readable, digital storage device storing executable instructions which cause a processor to generate a consistent image registration between a first image data set and a second image data set by performing steps comprising:
  (a) receiving a first image data set and a second image data set;
  (b) initializing a current forward transformation and a current reverse transformation;
  (c) computing an inverse of the current forward transformation and an inverse of the current reverse transformation:
  (d) jointly estimating a consistent forward and a consistent reverse transformation between the first image data set and the second image data set by minimizing a difference between the current forward transformation and the inverse of the current reverse transformation and minimizing a difference between the current reverse transformation and the inverse of the current forward transformation; and
  (e) outputting the jointly estimated forward and the reverse transformations.

48. The storage device of claim 30 storing executable instructions which cause a processor to perform the further step of:
  (f) transforming the first image data set with the forward transformation and transforming the second image data set with the reverse transformation.

49. The storage device of claim 48 storing executable instructions which cause a processor to perform the further step of:
  (g) outputting the transformed first image data set and the transformed second image data set.

50. The storage device of claim 30, wherein the instructions causing a processor to jointly estimate a consistent forward and a consistent reverse transformation includes instructions to perform the substeps of:
  (i) computing a new consistent forward transformation; and
  (ii) computing a new consistent reverse transformation.

51. The storage device of claim 50, wherein the instructions causing a processor to jointly estimate a consistent forward and a consistent reverse transformation includes instructions to perform the further substeps of:
  (iii) setting the current forward transformation to the new consistent forward transformation;
  (iv) setting the current reverse transformation to the new consistent reverse transformation; and
  (v) repeating substeps (i)–(iv) until a predetermined condition is met.

52. The storage device of claim 30, wherein the instructions causing a processor to jointly estimate a consistent forward and a consistent reverse transformation utilize a symmetric cost function and an inverse consistency constraint.

53. The storage device of claim 52, wherein the instructions causing a processor to jointly estimate a consistent forward and a consistent reverse transformation also utilize a correspondence constraint function.

54. The storage device of claim 53, wherein the correspondence constraint function conforms to corresponding manifolds in the first image data set and the second image data set, wherein each image data set has a dimension, and wherein the manifold in the first image data set is of a dimension lesser than or equal to the dimension of the first image data set and the manifold in the second image data set is of a dimension lesser than or equal to the dimension of the second image data set.

55. The storage device of claim 52, wherein the instructions causing a processor to jointly estimate a consistent forward and a consistent reverse transformation also utilize a diffeomorphic constraint function.

56. The storage device of claim 52, wherein the instructions causing a processor to jointly estimate a consistent forward and a consistent reverse transformation also utilize a diffeomorphic constraint function and a correspondence constraint function.

* * * * *